(12) United States Patent
Huang et al.

(10) Patent No.: US 11,848,798 B2
(45) Date of Patent: Dec. 19, 2023

(54) ARRAY CONTROLLING SYSTEM FOR CONTROLLING MULTIPLE ARRAY MODULES AND CONTROLLING METHOD THEREOF

(71) Applicant: RHYMEBUS CORPORATION, Taichung (TW)

(72) Inventors: Hsuan-Yu Huang, Taichung (TW); Shun-Han Ko, Taichung (TW); Yu-Hung Lin, Taichung (TW); Po-Chun Chiu, Taichung (TW); Hsien-Tang Jao, Taichung (TW)

(73) Assignee: RHYMEBUS CORPORATION, Taichung (TW)

( * ) Notice: Subject to any disclaimer, the term of this patent is extended or adjusted under 35 U.S.C. 154(b) by 324 days.

(21) Appl. No.: 17/330,432

(22) Filed: May 26, 2021

(65) Prior Publication Data

US 2022/0255769 A1     Aug. 11, 2022

(30) Foreign Application Priority Data

Feb. 9, 2021   (TW) .................................. 110105088
Feb. 9, 2021   (TW) .................................. 110201733

(51) Int. Cl.
*H04L 12/40*     (2006.01)
*G06F 16/23*     (2019.01)
*G06F 13/42*     (2006.01)
*H04L 67/12*     (2022.01)

(52) U.S. Cl.
CPC .... *H04L 12/40071* (2013.01); *G06F 13/4282* (2013.01); *G06F 16/23* (2019.01); *H04L 12/40078* (2013.01); *H04L 67/12* (2013.01)

(58) Field of Classification Search
CPC ......... H04L 12/40071; H04L 12/40078; H04L 67/12; G06F 13/4282; G06F 16/23
See application file for complete search history.

(56) References Cited

U.S. PATENT DOCUMENTS 3,914,690 A * 10/1975 Shelnutt ................... G01R 1/36
                                                       324/110
11,284,544 B1 * 3/2022 Lingle ................. G06F 11/3058
(Continued)

FOREIGN PATENT DOCUMENTS

EP           4137896 A1 *  2/2023  ......... G06K 7/10722
WO    WO-2020068826 A1 *  4/2020  ......... H04L 63/1416

*Primary Examiner* — Mounir Moutaouakil
(74) *Attorney, Agent, or Firm* — CKC & Partners Co., LLC (57) ABSTRACT

An array controlling system includes a database, a controlling center and an array device. The controlling center reads a plurality of data of the database. The array device includes a processing unit, a main bus and an array unit. The processing unit receives a command of the controlling center and converts the command into a communication data. The main bus is configured to transmit the communication data to the array unit. A plurality of array modules of the array unit are connected in series with each other through a serial bus, and sequentially receive the communication data. The processing unit controls each of the array modules according to the communication data. A plurality of sensing data of the array modules are collected to the processing unit. The processing unit returns the sensing data to the database or the controlling center to update the database.

13 Claims, 8 Drawing Sheets

(56) References Cited

U.S. PATENT DOCUMENTS

| | | | |
|---|---|---|---|
| 11,662,986 B1* | 5/2023 | Catron | G06F 8/41 718/104 |
| 2018/0097886 A1* | 4/2018 | Inoue | G06F 16/438 |
| 2022/0092398 A1* | 3/2022 | Jennings | G06N 3/08 |
| 2022/0133164 A1* | 5/2022 | Mushtaq | G16H 10/60 600/509 |
| 2022/0261020 A1* | 8/2022 | Garcia Molina | A47C 21/04 |

* cited by examiner

ARRAY CONTROLLING SYSTEM FOR CONTROLLING MULTIPLE ARRAY MODULES AND CONTROLLING METHOD THEREOF

RELATED APPLICATIONS

This application claims priority to Taiwan Application Serial Number 110105088 and Taiwan Application Serial Number 110201733, filed Feb. 9, 2021, which are herein incorporated by reference.

BACKGROUND

Technical Field

The present disclosure relates to a controlling system applied to a plurality of modules and a controlling method thereof. More particularly, the present disclosure relates to an array controlling system and a controlling method thereof.

Description of Related Art

Since the limitation that a port of a single one Micro Processing Unit (MPU) of the conventional controlling system applied to a plurality of modules can only be connected to and controls a sensing module or a function module, the conventional controlling system usually uses a one-to-one data transmitting method. Therefore, the conventional controlling system needs to use a plurality of MPUs to control a plurality of the sensing modules and a plurality of the function modules at the same time, and collect a plurality of sensing signals of the sensing modules. If MPUs are used, the manufacturing cost of the conventional controlling system rises significantly, and the wiring of the conventional controlling system is more complicated so as to increase the difficulty of subsequent maintenance and management. In response to determining that there are requirements for expanding or replacing the sensing modules or the function modules, the conventional controlling system must re-plan the internal wiring and install the additional MPUs to achieve the aforementioned requirements.

Furthermore, the conventional controlling system usually assembles a plurality of signal lines and the modules on a printed circuit board to form a Printed Circuit Board Assembly (PCBA). In response to determining that one of the modules is required for customization or is damaged, the entire PCBA needs to be replaced, which is inconvenient and not economical.

In view of the problems of the abovementioned controlling system applied to the modules, how to build a system that can control the modules with fewer MPUs or even the single one MPU is highly anticipated by the public and becomes the goal and the direction of relevant industry efforts.

SUMMARY

According to one aspect of the present disclosure, an array controlling system includes a database, a controlling center and at least one array device. The database includes a plurality of data. The controlling center is signally connected to the database and reads the data. The at least one array device is signally connected to the database and the controlling center, and includes a processing unit, a main bus and at least one array unit. The processing unit receives a command of the controlling center and converts the command into a communication data. The main bus is electrically connected to the processing unit for transmitting the communication data. The at least one array unit is electrically connected to the main bus and receives the communication data. The at least one array unit includes a plurality of array modules and a serial bus. The array modules are connected in series with each other through the serial bus. The array modules sequentially receive the communication data. The processing unit controls each of the array modules according to the communication data. The array modules generate a plurality of sensing data, respectively. The sensing data are collected to the processing unit through the serial bus and the main bus. The processing unit returns the sensing data to either the database or the controlling center for updating the database.

According to another aspect of the present disclosure, an array controlling method includes performing a data reading step, a command converting step, a transmitting step, a controlling step and an updating step. First, the data reading step is performed to drive a controlling center to read a plurality of data from a database and generate a command. Then, the command converting step is performed to drive a processing unit of at least one array device to receive the command and convert the command into a communication data. The at least one array device includes at least one array unit, and the at least one array unit includes a plurality of array modules and a serial bus. Then, the transmitting step is performed to drive a main bus to transmit the communication data from the processing unit to the at least one array unit, and then drive the serial bus to sequentially transmit the communication data to the array modules. Then, the controlling step is performed to drive the processing unit to control each of the array modules according to the communication data, and the array modules generate a plurality of sensing data, respectively. Finally, the updating step is performed to drive the serial bus and the main bus to transmit the sensing data and collect the sensing data to the processing unit, and then drive the processing unit to return the sensing data to either the database or the controlling center for updating the database.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below.

However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
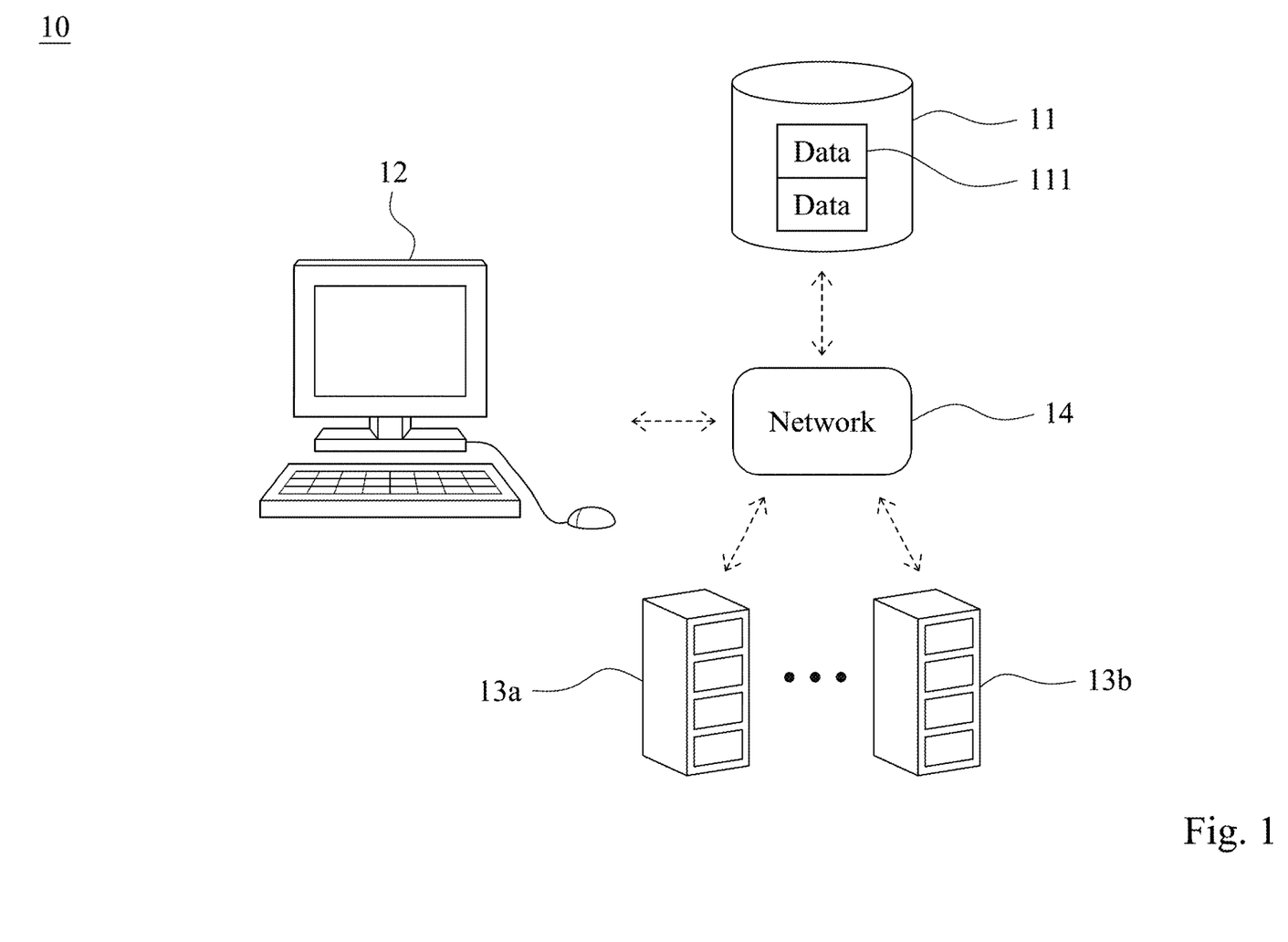
FIG. 1 shows a schematic view of an array controlling system according to an embodiment of the present disclosure.

FIG. 1 shows a schematic view of an array controlling system 10 according to an embodiment of the present disclosure. In FIG. 1, the array controlling system 10 includes a database 11, a controlling center 12, a plurality of array devices 13a, 13b and a network 14. The database 11 includes a plurality of data 111. In other embodiments, the database 11 can be an Enterprise Resource Planning (ERP) management platform, and a number of the array devices can be increased or decreased according to requirements, but the present disclosure is not limited thereto. The controlling center 12 is signally connected to the database through the network 14 and reads the data 111 of the database 11. The array devices 13a, 13b is signally connected to the database 11 and the controlling center 12 through the network 14. In addition, a communication interface between the database 11, the controlling center 12 and the array devices 13a, 13b can be a wireless network or a wired network. The wireless network is WIFI, and the wired network is Ethernet, but the present disclosure is not limited thereto.

Figure 2:
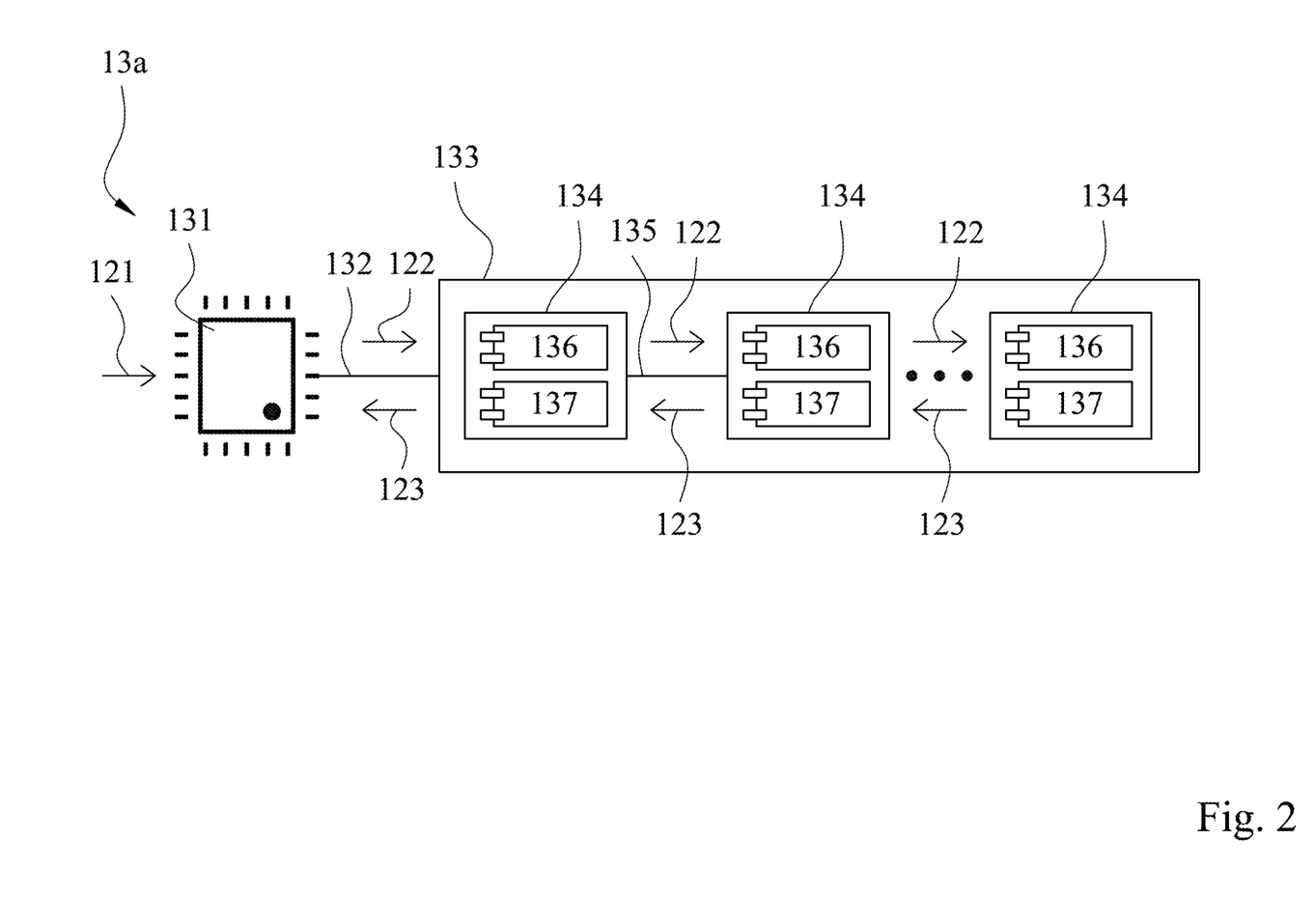
FIG. 2 shows a schematic view of an array device of FIG. 1.

Please refer to FIGS. 1 and 2. FIG. 2 shows a schematic view of the array device 13a of FIG. 1. In FIG. 2, the array device 13a includes a processing unit 131, a main bus 132 and an array unit 133. The processing unit 131 receives a command 121 of the controlling center 12 through the network 14 and converts the command 121 into a communication data 122. The main bus 132 is electrically connected to the processing unit 131 for transmitting the communication data 122. The array unit 133 is electrically connected to the main bus 132 and receives the communication data 122.

Especially, the array unit 133 includes a plurality of array modules 134 and a serial bus 135. The array modules 134 are connected in series with each other through the serial bus 135, so that the array modules 134 sequentially receive the communication data 122, and the processing unit 131 controls each of the array modules 134 according to the communication data 122. Further, the array modules 134 generate a plurality of sensing data 123, respectively. The sensing data 123 are collected to the processing unit 131 through the serial bus 135 and the main bus 132. In detail, the main bus 132 is used to transmit the communication data 122 and the sensing data 123 between the processing unit 131 and the array unit 133. The serial bus 135 is used to transmit the communication data 122 and the sensing data 123 between each two of the array modules 134 of the array unit 133. Finally, the processing unit 131 returns the sensing data 123 to the database 11 and the controlling center 12 for updating the data 111 of the database 11.

Therefore, the array controlling system 10 of the present disclosure only uses the processing unit 131 to enable the command 121 issued by the controlling center 12 to simultaneously control each of the array modules 134 and update the database 11.

In detail, the array devices 13a, 13b are signally connected to the controlling center 12 through the network 14. The controlling center 12 can be a mobile phone, a computer, a tablet or other devices equipped with a Central Processing Unit (CPU), a Digital Signal Processor (DSP), a programmable controller or an intelligent controlling terminal equipment of Application Specific Integrated Circuit (ASIC). The controlling center 12 is equipped with an input interface and a display interface to optimize the operations of a user, and can be signally connected to the database 11 upper than the controlling center 12 or an enterprise resource planning management platform through the network 14 for managing and monitoring the array devices 13a, 13b.

Furthermore, the main bus 132 can include one of a Serial Peripheral Interface (SPI), an Inter-Integrated Circuit (I2C) interface, a Universal Asynchronous Receiver/Transmitter (UART) interface, a digital Input/Output (I/O) interface and a differential signaling interface, and a plurality of Pulse-Width Modulation (PWM) signal lines. The serial bus 135 can include one of a SPI, an I2C interface, a UART interface, a digital I/O interface and a differential signaling interface, and a PWM signal line. Moreover, the processing unit 131 can include a Micro Processing Unit (MPU) and a communication interface adapter, and the communication interface adapter is responsible for converting the command 121 issued by the controlling center 12 into a communication interface signal (that is, the communication data 122) used by the main bus 132 and the serial bus 135. Furthermore, each of the array modules 134 captures its own information (e.g., an identification code or a port address) from the communication data 122, and then transmits the communication data 122 to the array module 134 which is the next.

Figure 3:
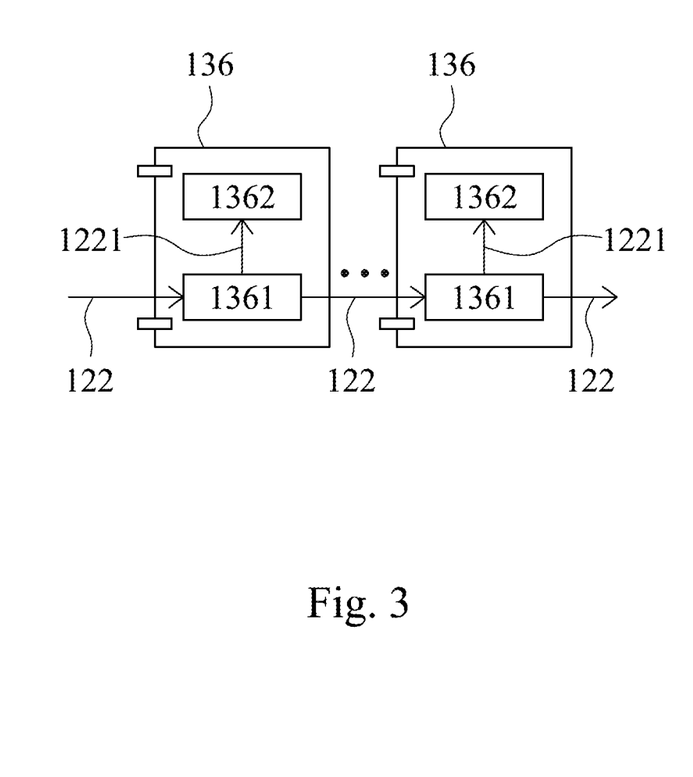
FIG. 3 shows a schematic view of a plurality of function modules of FIG. 2.

Please refer to FIGS. 2 and 3. FIG. 3 shows a schematic view of a plurality of function modules 136 of FIG. 2. In FIG. 3, each of the array modules 134 includes a function module 136. The function module 136 includes a function processor 1361 and at least one function element 1362, and the function processor 1361 is electrically connected to the at least one function element 1362. The function processor 1361 can be a shift register or a Microcontroller Unit (MCU) for receiving the communication data 122 and generating a controlling signal 1221. In other embodiments, a number of the at least one function element 1362 is plural, one of the function elements 1362 can be an indicator light, and another of the function elements 1362 can be a gate switch. The function processor 1361 controls opening and closing of the gate switch, or on and off of the indicator light through the controlling signal 1221.

Figure 4:
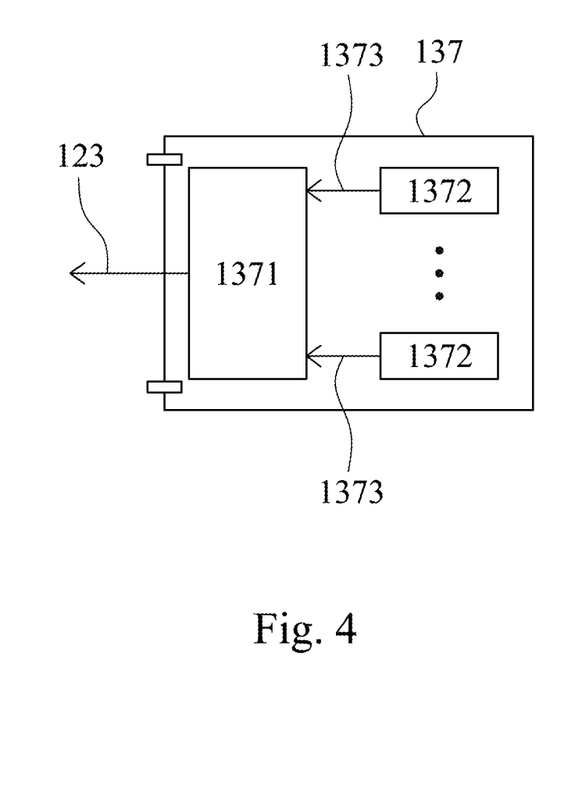
FIG. 4 shows a schematic view of a sensing module of FIG. 2.

Please refer to FIGS. 2 and 4. FIG. 4 shows a schematic view of a sensing module 137 of FIG. 2. In FIG. 4, each of the array modules 134 further includes a sensing module 137. The sensing module 137 includes a sensing processor 1371 and a plurality of sensing elements 1372. Each of the sensing elements 1372 can be a light sensor, an acoustic wave sensor, a magnetic field sensor, a pressure sensor, a temperature sensor, a humidity sensor or a micro switch, and one of the sensing elements 1372 detects a measured target (not shown) to generate a sensing signal 1373. The sensing processor 1371 is electrically connected to the sensing elements 1372, so that the sensing processor 1371 temporarily stores the sensing signals 1373 generated from the sensing elements 1372 and converts the sensing signals 1373 into the sensing data 123.

In detail, in response to determining that the sensing elements 1372 are triggered by the measured targets or any external factors, respectively, each of the sensing elements 1372 generates the sensing signal 1373 and transmits the sensing signal 1373 to the sensing processor 1371 to be decoded to the sensing data 123, and the sensing processor 1371 instantly returns the sensing data 123 to the processing unit 131. In addition, the processing unit 131 automatically scans the sensing modules 137 of the array modules 134 after a fixed time (e.g., 5 or 10 minutes) for receiving the sensing data 123. It is worth noting that the sensing data 123 can be converted from single one or multiple of the sensing signals 1373.

Figure 5:
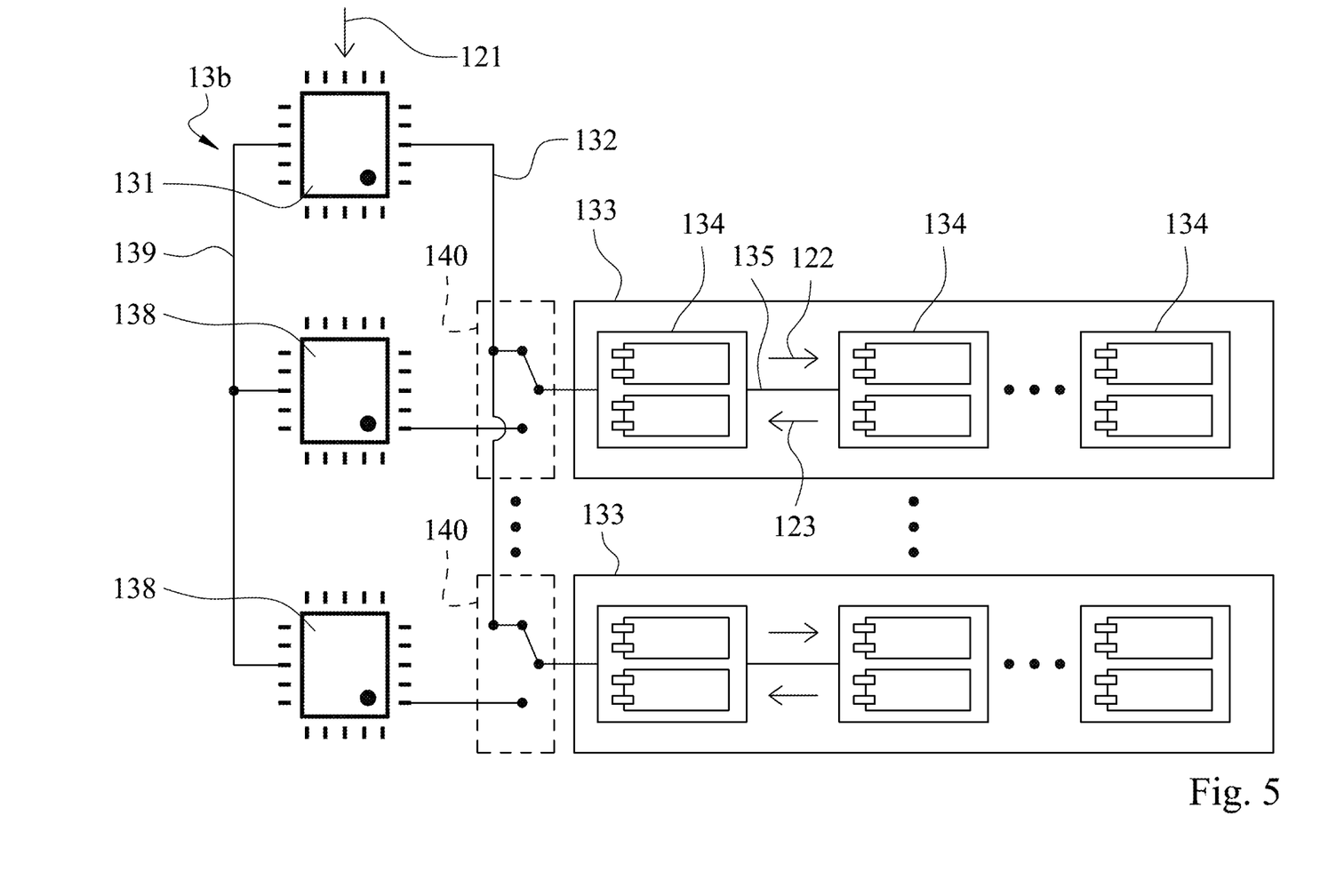
FIG. 5 shows a schematic view of another array device of FIG. 1.

FIG. 5 shows a schematic view of another array device 13b of FIG. 1. In FIG. 5, the array device 13b includes a processing unit 131, a main bus 132 and a plurality of array units 133. The processing unit 131, the main bus 132, and each of the array units 133 in FIG. 5 are the same as the corresponding elements in FIG. 2, and will not be detailedly described herein. It is worth noting that the array device 13b further includes a plurality of accelerators 138 and a communication bus 139. Specifically, the communication bus 139 is electrically connected to the processing unit 131 and each of the accelerators 138, so that the accelerators 138 are expanded to the processing unit 131 through the communication bus 139 and transmit the communication data 122 and the sensing data 123 of the array units 133.

In addition, the array device 13b further includes a plurality of switches 140. The switches 140 are disposed on the main bus 132. The accelerators 138 switch the switches 140, respectively, so that the accelerators 138 are electrically connected to the array units 133, respectively. In detail, the communication bus 139 uses a RS-485 interface to expand the accelerators 138 to the processing unit 131. The accelerator 138 is connected to the corresponding array unit 133 by switching the switch 140 corresponding to the main bus 132 so as to increase the transmission speeds of the communication data 122 and the sensing data 123.

Moreover, each of the array modules 134 of the present disclosure can be a Printed Circuit Board Assembly (PCBA). In response to determining that one of the array modules 134 is damaged or is required for customization, the array device 13b can directly replace the one of the array modules 134, so that the subsequent equipment facilitates expansion or reduction. Therefore, the array controlling system 10 of the present disclosure can be applied to a field that performs the corresponding controlling requirements according to the sensing signal 1373, or be applied to a field that requires the system to output a signal to prompt the operator. For example, a large livestock breeding place, a material storage place or a library.

Figure 6:
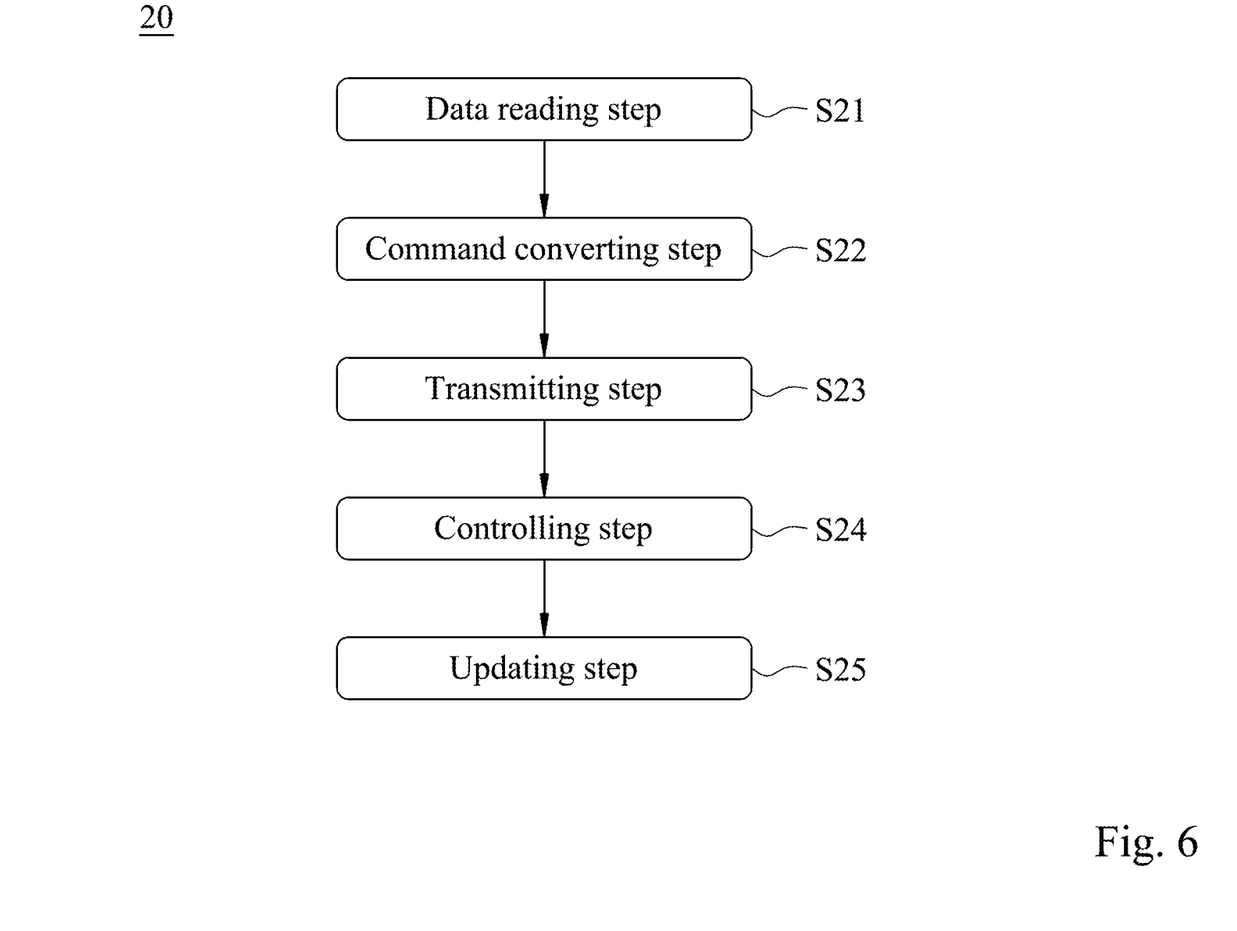
FIG. 6 shows a flow chart of an array controlling method according to another embodiment of the present disclosure.

Please refer to FIGS. 1 to 6. FIG. 6 shows a flow chart of an array controlling method 20 according to another embodiment of the present disclosure. In FIG. 6, the array controlling method 20 includes performing a data reading step S21, a command converting step S22, a transmitting step S23, a controlling step S24 and an updating step S25.

The data reading step S21 is performed to drive the controlling center 12 to read the data 111 from the database 11 and generate the command 121.

The command converting step S22 is performed to drive the processing unit 131 of the array device 13a to receive the command 121 and convert the command 121 into the communication data 122. The array device 13a includes the array unit 133, and the array unit 133 includes the array modules 134 and the serial bus 135.

The transmitting step S23 is performed to drive the main bus to transmit the communication data 122 from the processing unit 131 to the array unit 133, and then drive the serial bus 135 to sequentially transmit the communication data 122 to the array modules 134.

The controlling step S24 is performed to drive the processing unit 131 to control each of the array modules 134 according to the communication data 122, and the array modules 134 generate the sensing data 123, respectively.

The updating step S25 is performed to drive the serial bus 135 and the main bus 132 to transmit the sensing data 123 and collect the sensing data 123 to the processing unit 131, and then drive the processing unit 131 to return the sensing data 123 to either the database 11 or the controlling center 12 for updating the database 11.

Therefore, the array controlling method 20 of the present disclosure uses the main bus 132 and the serial bus 135 to sequentially transmit the communication data 122 of the processing unit 131 to the array modules 134, and receives the sensing data 123 of each of the array modules 134 so as to control each of the array modules 134 and update the database 11 at the same time.

Figure 7:
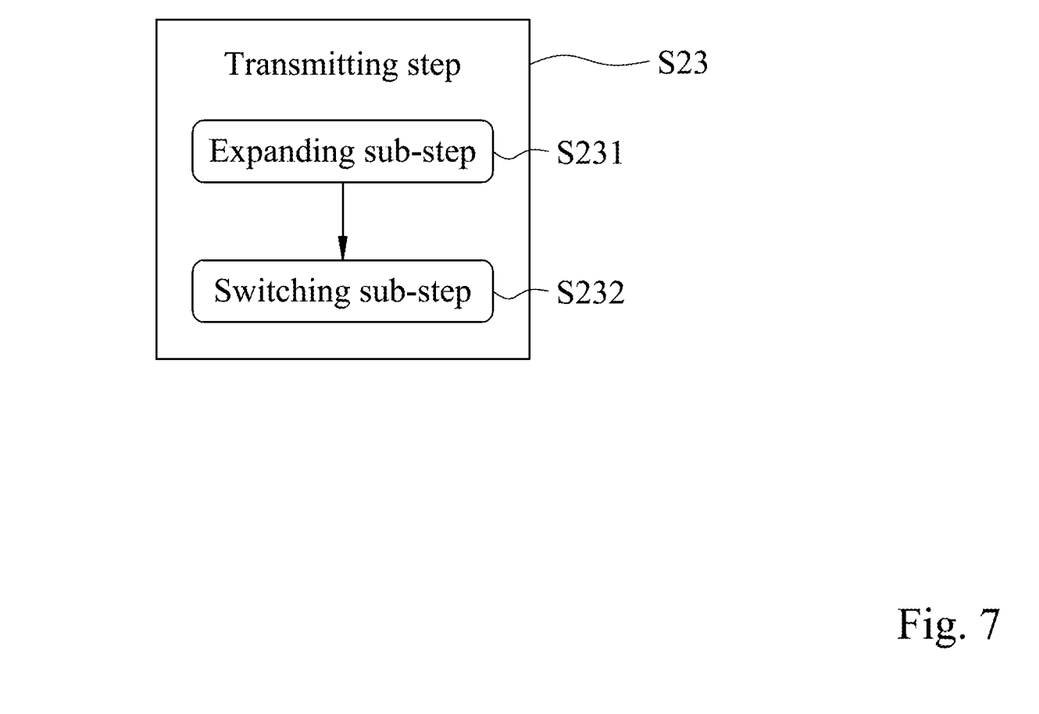
FIG. 7 shows a flow chart of a transmitting step of FIG. 6.

Please refer to FIGS. 6 and 7. FIG. 7 shows a flow chart of the transmitting step S23 of FIG. 6. In FIG. 7, the transmitting step S23 includes performing an expanding sub-step S231 and a switching sub-step S232. The expanding sub-step S231 is performed to drive the processing unit 131 to expand the accelerators 138 through the communication bus 139, and the accelerators 138 is configured to transmit the communication data 122 and the sensing data 123 of the array units 133. The switching sub-step S232 is performed to drive the switches 140 to be disposed on the main bus 132, and is performed to switch the switches 140, so that the accelerators 138 are electrically connected to the corresponding array units 133.

Figure 8:
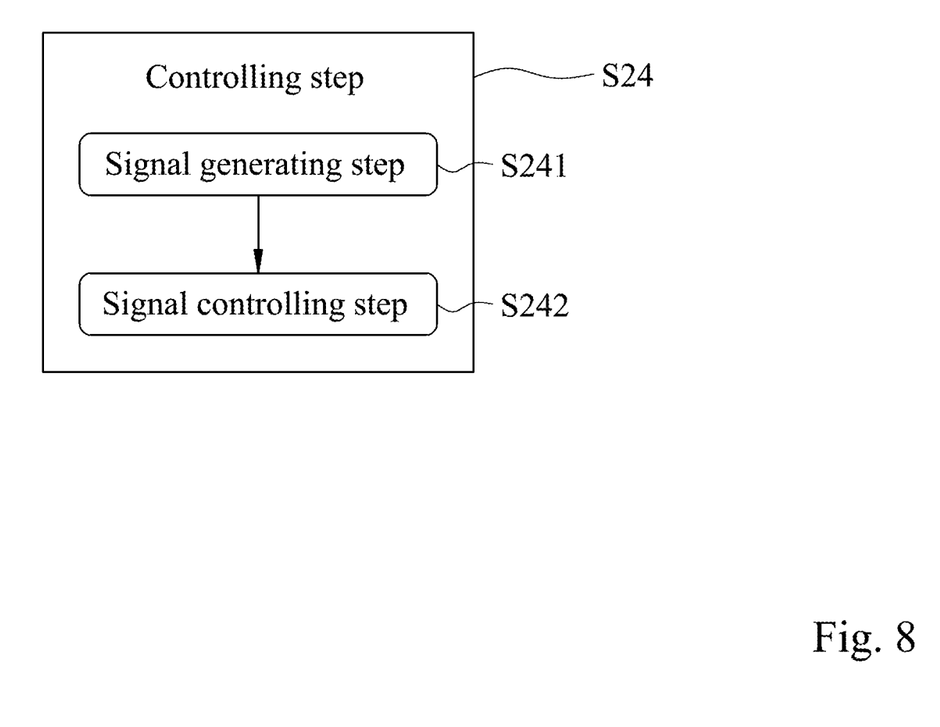
FIG. 8 shows a flow chart of a controlling step of FIG. 6.

Please refer to FIGS. 6 and 8. FIG. 8 shows a flow chart of the controlling step S24 of FIG. 6. In FIG. 8, the controlling step S24 includes performing a signal generating step S241 and a signal controlling step S242. The signal generating step S241 is performed to drive the function processor 1361 of the function module 136 to receive the communication data 122 and generate the controlling signal 1221 according to the communication data 122. The signal controlling step S242 is performed to drive the functional processor 1361 to control the function element 1362 of the function module 136 according to the controlling signal 1221.

Figure 9:
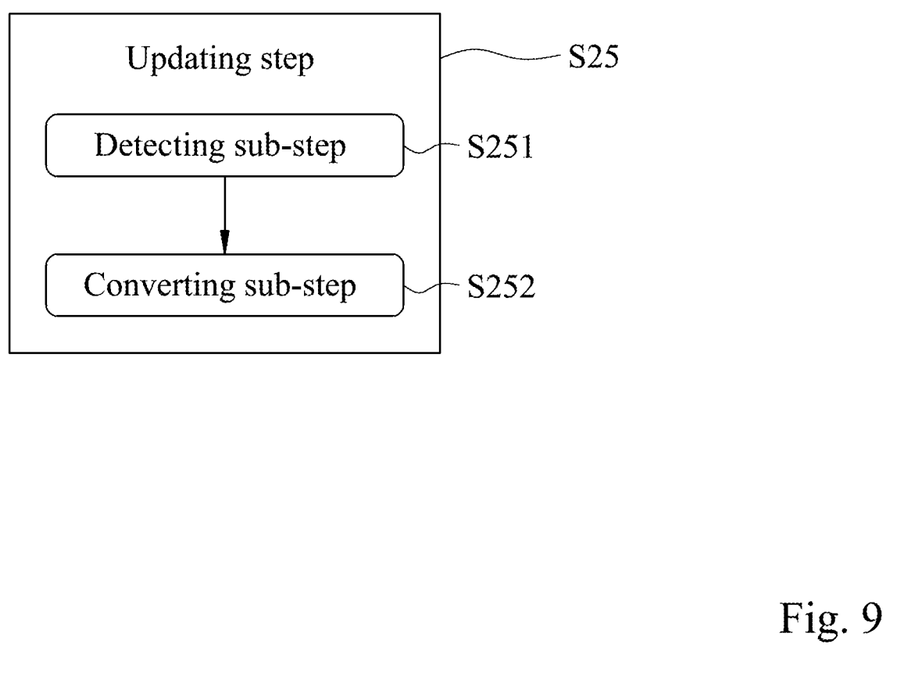
FIG. 9 shows a flow chart of an updating step of FIG. 6.

Please refer to FIGS. 6 and 9. FIG. 9 shows a flow chart of the updating step S25 of FIG. 6. In FIG. 9, the updating step S25 includes performing a detecting sub-step S251 and a converting sub-step S252. The detecting sub-step S251 is performed to drive the sensing element 1372 of the sensing module 137 to detect the measured target and generate the sensing signal 1373. The converting sub-step S252 is performed to drive the sensing processor 1371 of the sensing module 137 to temporarily store the sensing signal 1373 and convert the sensing signal 1373 into the sensing data 123.

In summary, the present disclosure has the following advantages: First, only using single one of the processing unit to control the array modules so as to reduce the manufacturing cost of the array controlling system. Second, it is favorable for automatically updating the data of the database, so that the controlling center immediately manages and monitors the array devices in real time. Third, the present disclosure not only controls the array modules at the same time but also directly replaces one of the array modules.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An array controlling system, comprising:
   a database comprising a plurality of data;
   a controlling center signally connected to the database and reading the data; and
   at least one array device signally connected to the database and the controlling center, and comprising:
      a processing unit receiving a command of the controlling center and converting the command into a communication data;
      a main bus electrically connected to the processing unit for transmitting the communication data; and
      at least one array unit electrically connected to the main bus and receiving the communication data, wherein the at least one array unit comprises a plurality of array modules and a serial bus, and the array modules are connected in series with each other through the serial bus;
   wherein the array modules sequentially receive the communication data, and the processing unit controls each of the array modules according to the communication data;
   wherein the array modules generate a plurality of sensing data, respectively, the sensing data are collected to the processing unit through the serial bus and the main bus, and the processing unit returns the sensing data to either the database or the controlling center for updating the database;
   wherein each of the array modules comprises:
      a function module, comprising:
         a function processor receiving the communication data and generating a controlling signal; and
         at least one function element electrically connected to the function processor and controlled by the controlling signal;
      wherein a number of the at least one function element is plural, and one of the function elements is an indicator light, and another of the function elements is a gate switch;
      wherein the function processor controls opening and closing of the gate switch, or on and off of the indicator light through the controlling signal.

2. The array controlling system of claim 1, wherein each of the array modules further comprises:
   a sensing module, comprising:
      at least one sensing element configured to detect a measured target and generate a sensing signal; and
      a sensing processor electrically connected to the at least one sensing element and temporarily storing the sensing signal, wherein the sensing processor converts the sensing signal into one of the sensing data.

3. The array controlling system of claim 2, wherein the processing unit automatically scans the sensing modules of the array modules after a fixed time for receiving the sensing data.

4. The array controlling system of claim 2, wherein in response to determining that the at least one sensing element generates the sensing signal, the sensing processor returns the one of the sensing data to the processing unit.

5. The array controlling system of claim 2, wherein the at least one sensing element is a light sensor, an acoustic wave sensor, a magnetic field sensor, a pressure sensor, a temperature sensor, a humidity sensor or a micro switch.

6. The array controlling system of claim 1, wherein a number of the at least one array unit is plural, and the at least one array device further comprises:
   a communication bus electrically connected to the processing unit; and
   at least one accelerator electrically connected to the communication bus and expanded to the processing unit through the communication bus for transmitting the communication data and the sensing data of one of the array units.

7. The array controlling system of claim 6, wherein the at least one array device further comprises:
   at least one switch disposed on the main bus;
   wherein the at least one accelerator switches the at least one switch, so that the at least one accelerator is connected to the one of the array units.

8. An array controlling method, comprising:
   performing a data reading step to drive a controlling center to read a plurality of data from a database and generate a command;
   performing a command converting step to drive a processing unit of at least one array device to receive the command and convert the command into a communication data, wherein the at least one array device comprises at least one array unit, and the at least one array unit comprises a plurality of array modules and a serial bus;
   performing a transmitting step to drive a main bus to transmit the communication data from the processing unit to the at least one array unit, and then drive the serial bus to sequentially transmit the communication data to the array modules;
   performing a controlling step to drive the processing unit to control each of the array modules according to the communication data, wherein the array modules generate a plurality of sensing data, respectively; and
   performing an updating step to drive the serial bus and the main bus to transmit the sensing data and collect the sensing data to the processing unit, and then drive the processing unit to return the sensing data to either the database or the controlling center for updating the database;
   wherein each of the array modules comprises a function module, and the controlling step comprises:
      performing a signal generating step to drive a function processor of the function module to receive the communication data and generate a controlling signal according to the communication data; and
      performing a signal controlling step to drive the functional processor to control at least one function element of the function module according to the controlling signal;

wherein a number of the at least one function element is plural, and one of the function elements is an indicator light, and another of the function elements is a gate switch;

wherein the function processor controls opening and closing of the gate switch, or on and off of the indicator light through the controlling signal.

9. The array controlling method of claim 8, wherein each of the array modules comprises a sensing module, and the updating step comprises:

performing a detecting sub-step to drive at least one sensing element of the sensing module to detect a measured target and generate a sensing signal; and performing a converting sub-step to drive a sensing processor of the sensing module to temporarily store the sensing signal and convert the sensing signal into one of the sensing data.

10. The array controlling method of claim 9, wherein the processing unit automatically scans the sensing modules of the array modules after a fixed time for receiving the sensing data.

11. The array controlling method of claim 9, wherein in response to determining that the at least one sensing element generates the sensing signal, the sensing processor returns the one of the sensing data to the processing unit.

12. The array controlling method of claim 9, wherein the at least one sensing element is a light sensor, an acoustic wave sensor, a magnetic field sensor, a pressure sensor, a temperature sensor, a humidity sensor or a micro switch.

13. The array controlling method of claim 8, wherein a number of the at least one array unit is plural, the at least one array device further comprises a communication bus, and the transmitting step comprises:

performing an expanding sub-step to drive the processing unit to expand at least one accelerator through the communication bus for transmitting the communication data and the sensing data of one of the array units; and performing a switching sub-step to drive at least one switch to be disposed on the main bus, and then switch the at least one switch, so that the at least one accelerator connected to the one of the array units.

* * * * *